(No Model.) 2 Sheets—Sheet 1.

E. GOBBE.
GLASS TANK AND BLOWING FURNACE.

No. 578,058. Patented Mar. 2, 1897.

Witnesses:

Inventor:
Emile Gobbe (No Model.) 2 Sheets—Sheet 2.

E. GOBBE.
GLASS TANK AND BLOWING FURNACE.

No. 578,058. Patented Mar. 2, 1897.

Witnesses:

Inventor:

UNITED STATES PATENT OFFICE.

EMILE GOBBE, OF JUMET, BELGIUM, ASSIGNOR OF ONE-HALF TO JAMES A. CHAMBERS, OF PITTSBURG, PENNSYLVANIA.

GLASS TANK AND BLOWING FURNACE.

SPECIFICATION forming part of Letters Patent No. 578,058, dated March 2, 1897.

Application filed September 8, 1896. Serial No. 605,132. (No model.) Patented in France February 1, 1887, No. 181,246, and in Belgium March 17, 1887, No. 76,740.

*To all whom it may concern:*

Be it known that I, EMILE GOBBE, a citizen of Belgium, and a resident of Jumet, Hainaut, Belgium, have invented a new and useful Improvement in Glass Tank and Blowing Furnaces, (for which I obtained a patent in France, dated February 1, 1887, No. 181,246, and a patent in Belgium, dated March 17, 1887, No. 76,740,) of which the following is a specification.

My invention relates to glass-tank furnaces, its object being to provide for the operating of such furnaces in such a way that the heat of the furnace can be utilized for the heating of the glass on the blowpipes while it is being blown to shape by the blowers.

My invention comprises, generally stated, a glass-tank furnace having a melting-section with gas and air entrances in the side walls thereof, a cooling-section having side walls parallel with those of the melting-section and having in each of said side walls a series of blowing-ports to provide for the heating of the glass in the blowing thereof and beyond the same a series of gathering-ports. By this construction of the furnace the portion of the same which has heretofore been generally required for the cooling of the glass before it was gathered and which is maintained at a higher heat than the gathering end of the furnace is sufficiently high in heat for blowing purposes and can be utilized as a blowing-section of the furnace, and that in this way the proper heats for melting the glass, for blowing the glass, and for gathering may all be obtained in the same furnace.

To enable others skilled in the art to make and use my invention, I will describe the same more fully, referring to the accompanying drawings, in which—

Figure 1:
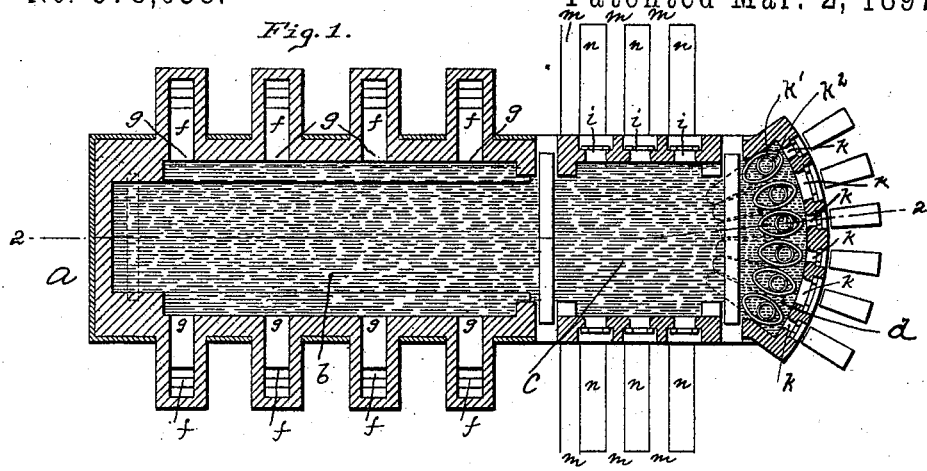
Figure 2:
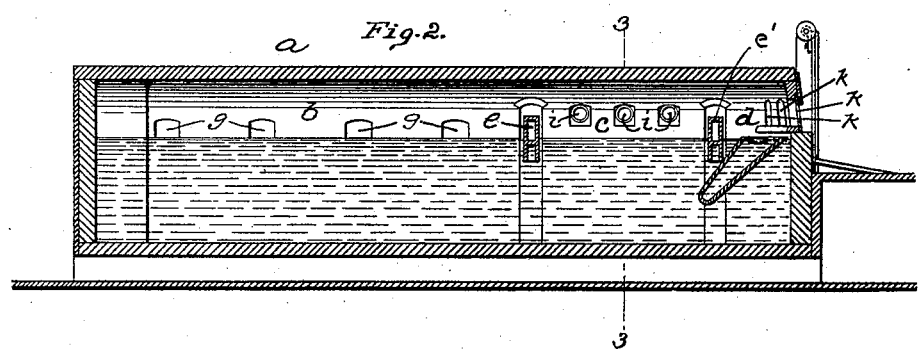
Figure 3:
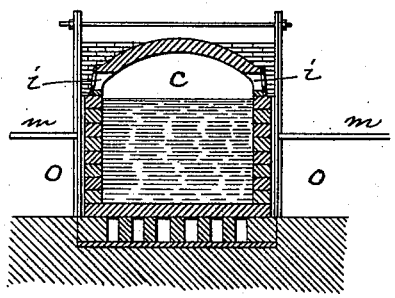
Figure 4:
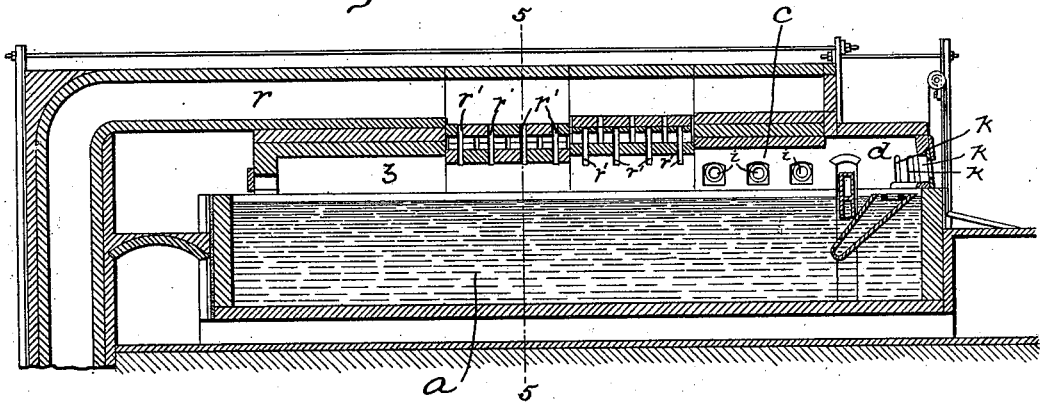
Figure 5:
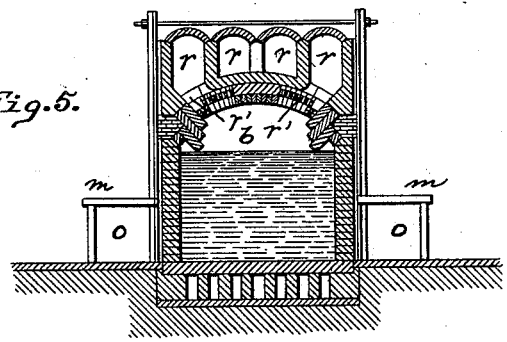

Figure 1 is a horizontal section of a glass-tank furnace embodying my invention. Fig. 2 is a longitudinal section of the same. Fig. 3 is a cross-section through a blowing-section of the furnace, and Figs. 4 and 5 show a different manner of introducing the heat.

Like letters of reference indicate like parts in each of the figures.

The glass-tank furnace can be of any suitable construction, the tank and furnace itself being supported by any suitable substructure, the furnace shown being of moderate size, as it is found that the invention is more particularly applicable to a furnace having not more than eight (8) or ten (10) gathering-ports than to a furnace of larger size which would require a larger number of blowing-ports, though my invention may be employed with a larger-sized furnace and a portion thereof be utilized as a blow-section.

In the drawings shown, $a$ is the tank, which is a continuous tank for the entire length of the furnace, but for the purposes of the invention may be considered as divided into three sections, the melting-chamber $b$, the blowing-section $c$, and the gathering end or section $d$. The melting-chamber $b$ is separated from the blowing-section by the floating bridge $e$, which may be of any suitable form, although for that matter the furnace may be operated without a bridge. A like floating bridge $e'$ may also be employed to separate the blowing-section $c$ from the gathering-section $d$.

In the furnace shown in Figs. 1, 2, and 3 the regular regenerators $f$ are located along the sides of the melting-section and have the ports $g$ leading into the same, such regenerators only extending along the melting-section and there being no such regenerators beyond the bridge $e$. In the blowing-section $c$ of the furnace are formed suitable blowing-ports $i$ of the desired size. In the drawings shown the blowing-ports $i$ are preferably raised some little distance above the side walls proper of the tank, so that the glass cylinders in being heated, while supported on the blowpipes, would not come in contact with the molten metal in the tank. It will be noticed that the side walls of the blowing-section are parallel with the side walls of the melting-section, and that the entire blowing-section is beyond the regular gas and air entrances and acts as a cooling-section through which the glass passes to the gathering end of the tank, and that the workmen in heating the glass for blowing insert it transversely of the length of the furnace, so that the glass and the cylinders formed therefrom are evenly heated throughout by the heat radiated from the melting-section and passing from the molten glass into the cooling-section. Beyond such blowing-section with its blowing-ports is the regular gathering-section of the furnace, and in the walls of such gathering-section are formed the gathering-ports $k$, which are somewhat smaller than the regular ports, the number of gathering-ports corresponding to the number of blowing-ports in the blowing-section. Suitable gathering-pockets $k'$ are arranged within the gathering-section $d$ opposite each gathering-port, said pockets having gathering-rings $k^2$ therein.

Extending out from the sides of the blowing-section of the furnace are the platforms $m$ and the spaces $n$, one such platform being provided for each blowing-port and extending across the pit $o$ at right angles to the walls of the melting-chamber, so as to provide for the swinging of the glass cylinder into said pit in the blowing operation.

In Figs. 4 and 5 I have illustrated my invention in connection with another form of furnace in which the heat is admitted from the top. The regenerators $r$ are arranged along the top and ports $r'$ admit the gases to the melting-section. So far as the present invention is concerned the rest of the furnace is identical with the construction shown in Figs. 1, 2, and 3.

In employing my improved furnace in the making of window-glass the furnace is heated up in the regular way and the glass is melted and fined in the melting-chamber $b$ of the tank and flows thence under the bridge into the gathering end thereof, some fining occurring in that portion of the tank, the glass being clarified therein and being gradually cooled as it flows from the melting-chamber to the end of the furnace where it is gathered. After the gathering of the glass it is necessary that the glass be sufficiently cooled to become viscid, so that it can easily be taken up by the blowpipes, and the gathering end of the furnace is necessarily, therefore, maintained at a low temperature compared with the melting-chamber.

The heat from the melting-chamber passing over the bridge and traveling along the top of the melted glass maintains the glass near the bridge and the portion of the furnace above the same at a higher heat than the gathering end, however, and this portion of the furnace I have utilized as the blowing-section. I have found that in the ordinary working of the furnace this portion of the furnace can be maintained at sufficiently high heat for the regular blowing operations, while the glass therein, which is gradually flowing to the gathering end, will be cooling, and may be sufficiently cooled when it reaches the gathering end to be easily gathered by the workmen. The glass is therefore gathered through the regular gathering-ports at the gathering end of the furnace, and after properly working it the blowers introduce it into the blowing-section of the furnace through the blowing-ports and are enabled to bring it to the proper heat for working and blowing in that portion of the furnace. The workmen while standing on the platforms opposite the respective blowing-holes can swing the glass and blow the same, introducing the cylinder as it is drawn out into the furnace and above the glass therein, and so heating the glass cylinder in the regular work of the blower. If it is found that a higher heat in the blowing-section is required, this can be obtained by increasing the supply of gas at the regenerators of the melting-chamber nearest the blowing-section, and if the heat is too high it can be regulated by the reducing of the gas at such regenerators. By so providing the blowing-section with its blowing ports and platforms between the melting-chamber and gathering end I am enabled to utilize the heat of the melting-furnace for blowing purposes, so causing a saving of fuel in the ordinary working of tank-furnaces for the making of window-glass of about one-third, and in so doing I obtain practically the most perfect conditions for the working, having a high-heat melting-chamber, lower but comparatively high heat in the blowing-section suitable for blowing the glass, and a low heat at the gathering end. In this way the glass can not only be made and refined and brought to the proper temperature for gathering, but can be heated for blowing in the same furnace. Another important advantage is that in so heating the glass in the blowing-section only radiated heat is employed, and there is no contact of the gases with the cylinders in heating the same and action of the sulfur thereof upon the glass cylinders is prevented. As the side walls of the blowing-section are parallel with the side walls of the melting-section, the glass to be heated for blowing and the cylinders formed therefrom are introduced through the blowing-port transversely of the length of the furnace, and are therefore subjected to a practically even heat for their full length.

What I claim as my invention, and desire to secure by Letters Patent, is—

A longitudinally-extending glass-tank furnace having a melting-section provided with gas and air entrances, a cooling-section having side walls parallel with those of the melting-section, and having in each of said walls a series of blowing-ports to provide for the heating of the glass in the blowing thereof, and blowing-platforms with intermediate spaces at right angles to the walls of the melting-chamber and beyond the same a series of gathering-ports, substantially as set forth.

In testimony whereof I, the said EMILE GOBBE, have signed this specification in the presence of two subscribing witnesses.

EMILE GOBBE.

Witnesses:
  J. FISHER REESE,
  HENRI LUTH.